United States Patent [19]
Wakabayashi et al.

[11] Patent Number: 5,978,599
[45] Date of Patent: *Nov. 2, 1999

[54] CAMERA HAVING VIBRATION CORRECTING FUNCTION

[75] Inventors: Hiroshi Wakabayashi, Yokohama; Hidenori Miyamoto, Urayasu; Yoshio Imura, Kawasaki, all of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,697

[22] Filed: Mar. 20, 1997

Related U.S. Application Data

[63] Continuation of application No. 08/418,578, Apr. 6, 1995, abandoned.

[30] Foreign Application Priority Data

Apr. 22, 1994 [JP] Japan ..................................... 6-085082
Aug. 17, 1994 [JP] Japan ..................................... 6-193057

[51] Int. Cl.[6] .................................................. G03B 17/00
[52] U.S. Cl. .............................................. 396/52; 396/55
[58] Field of Search ................................. 396/52, 53, 54, 396/55; 348/208; 359/557

[56] References Cited

U.S. PATENT DOCUMENTS

| | | | |
|---|---|---|---|
| 5,172,150 | 12/1992 | Teramoto et al. ....................... | 354/202 |
| 5,204,709 | 4/1993 | Sato ........................................ | 354/266 |
| 5,210,559 | 5/1993 | Ohki ....................................... | 354/202 |
| 5,335,042 | 8/1994 | Imafuji et al. ......................... | 354/430 |
| 5,623,704 | 4/1997 | Miyamoto et al. ...................... | 396/55 |

FOREIGN PATENT DOCUMENTS 6-113190  of 1994  Japan .

*Primary Examiner*—Eddie C. Lee

[57] ABSTRACT

A camera having a vibration correction function. The camera includes a vibration detecting unit that detects vibration of the camera. The camera further includes a vibration correcting unit that corrects vibration in photographing, based on a detected signal by said vibration detecting unit, a photographing-mode selecting unit that selects a successive photographing mode for successive photographing. The camera also includes a control unit that performs sampling of vibration signals in order to calculate a reference level of the detected signal corresponding to a signal level without vibration, based on the detected signal of said vibration detection unit. The control unit is arranged to perform the sampling of vibration signals immediately after completion of an exposure operation by a shutter unit of each frame when the successive photographing mode is selected by the photographing-mode selecting unit.

8 Claims, 13 Drawing Sheets

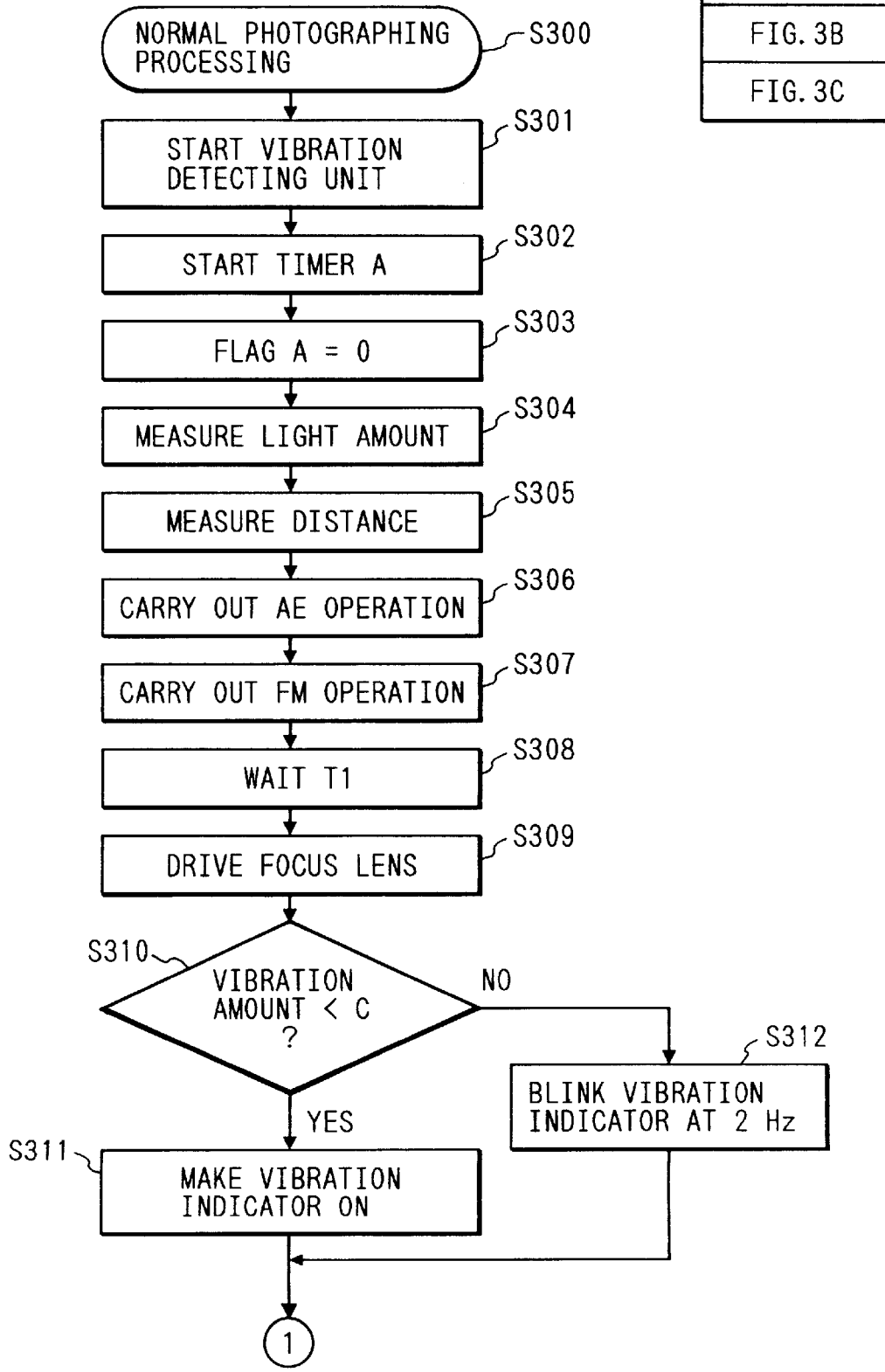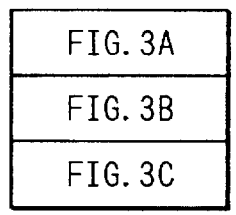

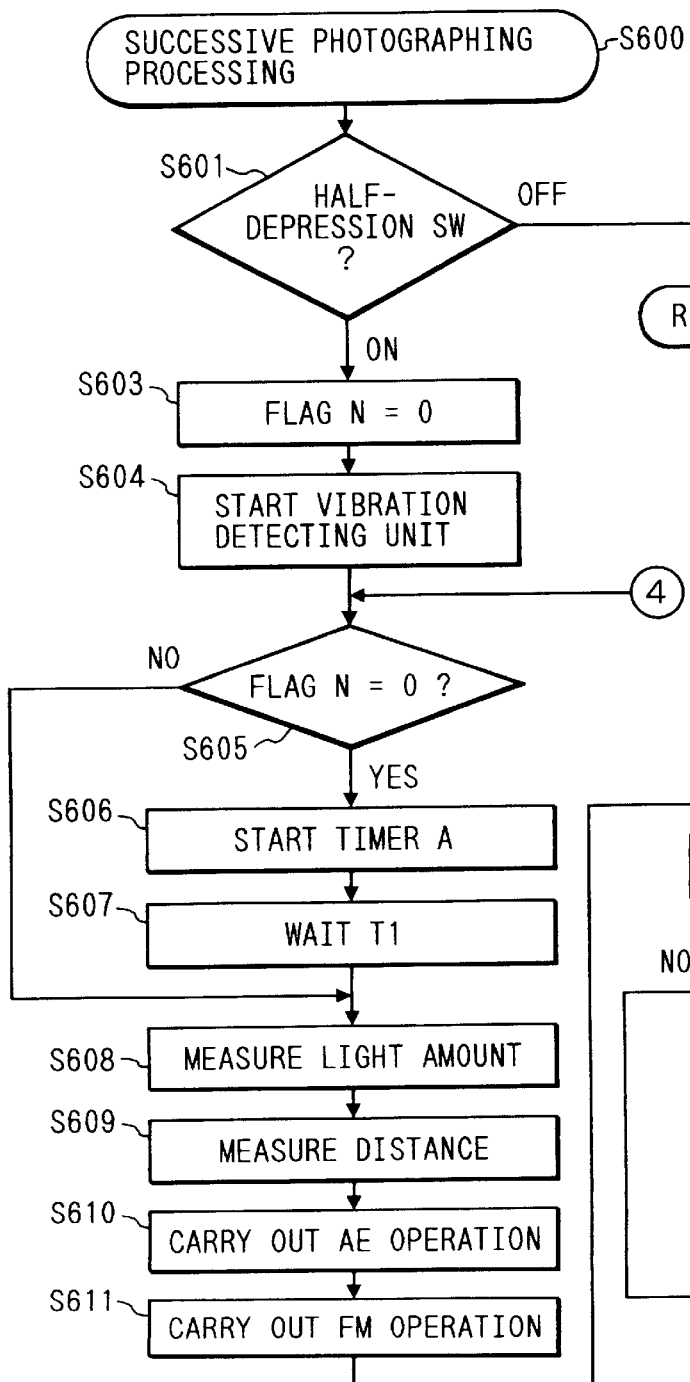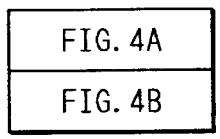

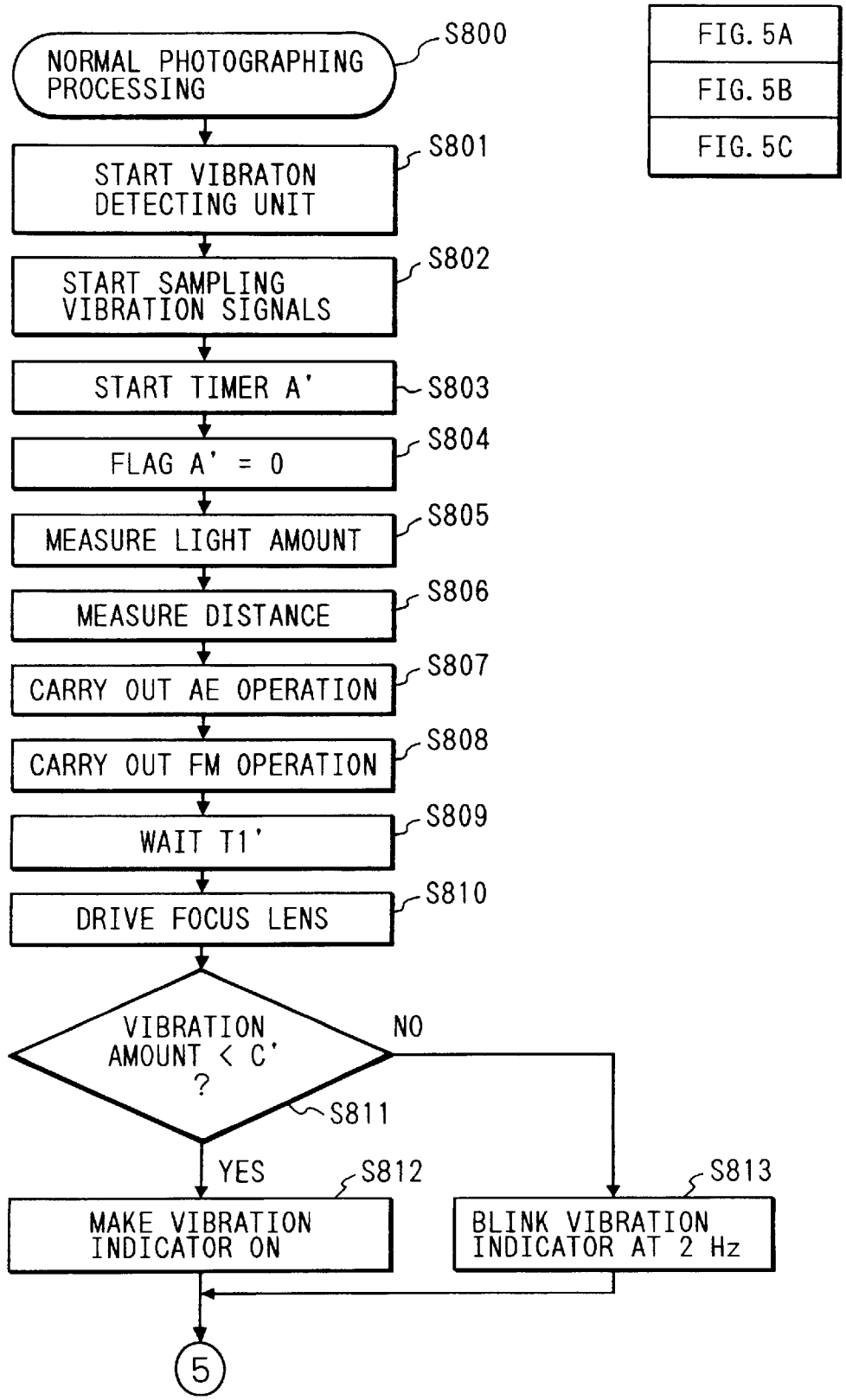

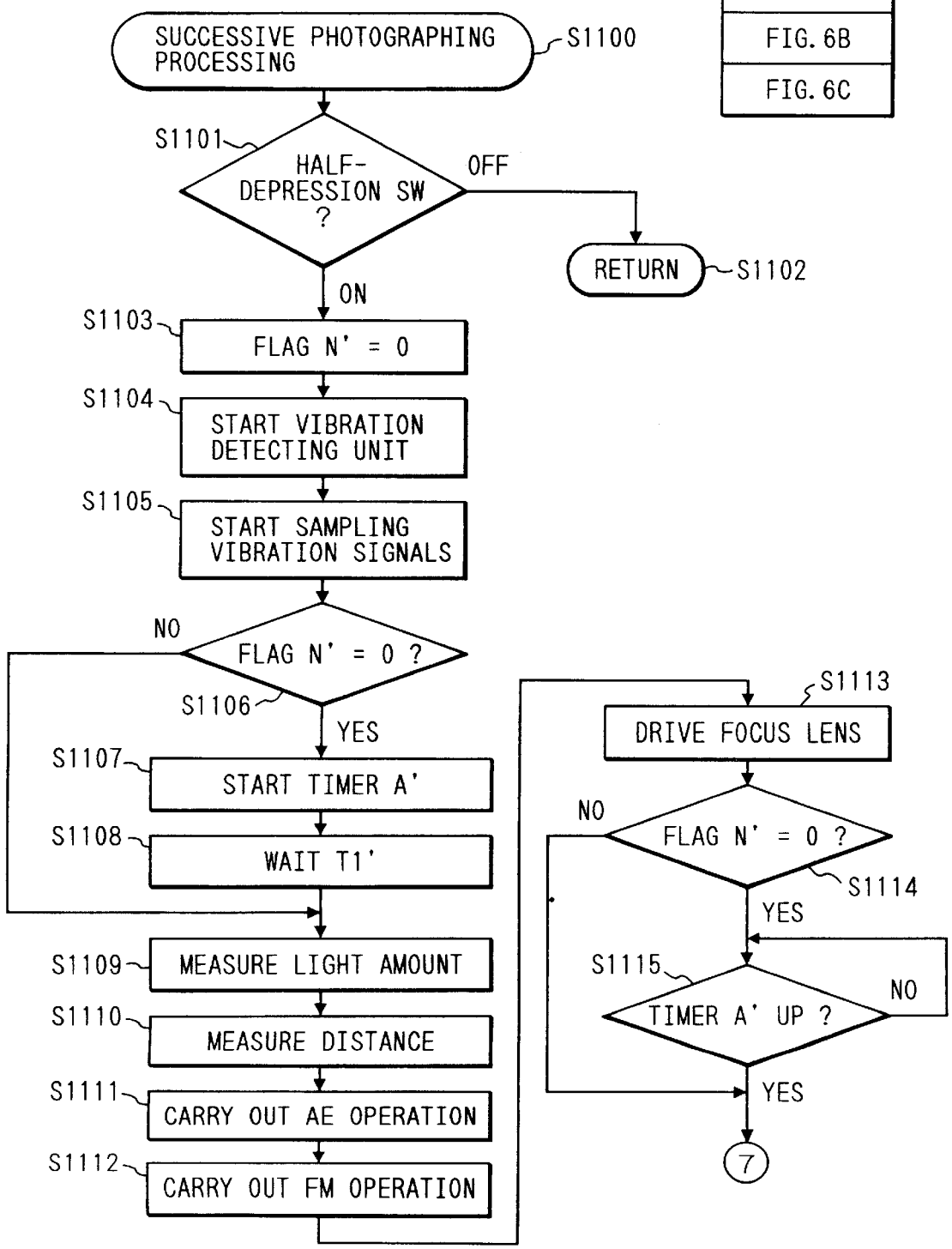

CAMERA HAVING VIBRATION CORRECTING FUNCTION

This application is a continuation of application Ser. No. 08/418,578, filed Apr. 6, 1995, now abandoned.

BACKGROUND OF THE INVENTION

1. Field of the Invention

The present invention relates to a camera having a function to correct vibration, and more particularly to a camera having a vibration correcting function as provided with a photographing-mode selecting unit to enable selection of a successive photographing mode.

2. Related Background Art

For conventional cameras provided with a vibration correcting unit, there are a variety of suggestions of vibration correcting apparatus having the structure to enable image vibration correction, in which, in order to correct image vibration caused by a shake of camera or particularly by inclination of a camera, an angular velocity sensor is used as vibration detecting means for detecting the shake or vibration of camera so as to detect vibration conditions by obtaining an angular velocity of the vibration of camera thereby and then vibration correcting means is driven according to a result of the detection to shift a photographing lens system as a main optical system or a vibration correction optical system as a part of the photographing lens system in directions perpendicular to the optical axis.

In the cameras provided with such a vibration correcting mechanism, image vibration is suppressed by controlling movement of the photographing lens system or the part thereof as a vibration correction optical system, whereby picture photography can be performed without image vibration even in exposure at slower shutter speed than in normal photography.

In the conventional technology as described above, a vibration detecting circuit is arranged to stop after completion of photography of a frame in normal photography. The vibration detecting circuit, however, takes a considerable time before stabilization of the circuit at restart (recharge of power), once it stops (or once the power supply is cut). Therefore, stop and start of the vibration detecting circuit is repeated every photographing in the successive photographing mode, so that photographing intervals each need to be set to a sufficiently long time period. This resulted in a problem of losing a quick photographing property.

Further, the cameras having such a vibration correcting function perform sampling of vibration signals to calculate an absolute amount of vibration from a sensor output from the vibration detecting sensor, that is, a reference level of detected signals corresponding to a state in which the angular velocity is "0" (a state without vibration).

Namely, the angular velocity sensor as a vibration detecting sensor has unstable sensor outputs at angular velocity of "0" because of drift etc., which could cause a possibility of degradation of vibration correction accuracy. It is thus considered that an average value of sensor outputs is obtained within a predetermined time period and then sensor outputs are calibrated using the average value as an output without vibration. For this purpose, sampling of vibration signals and averaging thereof are carried out.

Here, some hundred ms to about one second is normally necessary for sampling operations to obtain satisfactory accuracy. Such sampling operations are carried out between actuation of a half-depression switch in a shutter release button and actuation of a full-depression switch in the shutter release button.

Meantime, the cameras having the vibration correcting function as described above have the following problems when the successive photographing mode is selected as a photographing mode to execute continuous photography while keeping the shutter release button depressed.

In the conventional cameras, the sampling operations of vibration signals for the second or successive frame in the continuous photography are carried out between an end of a one-frame winding operation of film and a start of the next exposure. This lengthens a time lag at release of the shutter release button, which resulted in a problem of losing a shutter chance.

When the cameras having the vibration correcting function as described above are subjected to continuous photographing by a photographing operation of camera, for example actuation of the half-depression and full-depression switches in the shutter release button, or by a photographing mode, for example the continuous photographing mode, the vibration detection accuracy, in turn the vibration correction accuracy, is influenced by timings when the vibration detecting unit or the vibration correcting unit is started or stopped. Therefore, it is required to take some measures to solve the above-described problems, taking the above points into consideration.

SUMMARY OF THE INVENTION

The present invention has been accomplished taking the above problems into account, and an object thereof is to provide a camera having a vibration correcting function with a successive photographing mode excellent in quick photographing property upon successive photographing, as being arranged in such a manner that successive photographing is started after completion of zero detection of a vibration angle velocity of a vibration detecting unit and that the zero detection of vibration angle velocity is not carried out after the start of successive photographing.

Another object of the present invention is to provide a camera having a vibration correcting function which, when the successive photographing mode is selected to perform the continuous photographing, can properly perform sampling of vibration signals, can enhance the vibration detection accuracy, and can accurately perform the vibration correcting operation.

To achieve the above objects, a first aspect of the present invention involves a camera having a vibration correcting function, which comprises a vibration detecting unit for detecting vibration, a vibration correcting unit for correcting vibration upon photographing, based on a detected signal by the vibration detecting unit, and a photographing-mode selecting unit for selecting a successive photographing mode for continuous photographing, and which further comprises means for actuating the vibration correcting unit at exposure after a lapse of a circuit stabilizing time of the vibration detecting unit upon first photographing and for actuating the vibration correcting unit at exposure, irrespective of a lapse of the circuit stabilizing time of the vibration detecting unit, upon or after second photographing.

The vibration detecting unit is preferably a circuit for detecting an angular velocity.

In the first aspect of the present invention as described above, the camera is so arranged that at start of successive photographing, the successive photographing is started after completion of zero detection of the vibration angle velocity of the vibration detecting unit and that after the start of successive photographing, the zero detection of vibration angle velocity is not carried out, thereby curtailing a necessary time in successive photographing for stabilizing the circuit at restart of the vibration detecting circuit, which can achieve an excellent quick photographing property in the successive photographing mode.

A second aspect of the present invention involves a camera having a vibration correcting function, which comprises a vibration detecting unit for detecting vibration, a vibration correcting unit for correcting vibration in photographing, based on a detected signal by the vibration detecting unit, and a photographing-mode selecting unit for selecting a successive photographing mode for continuous photographing, and which further comprises a control unit for performing sampling of vibration signals in order to calculate a reference level of the detected signal corresponding to that without vibration, based on the detected signal by the vibration detecting unit, in which the control unit is arranged to perform the sampling of vibration signals immediately after completion of an exposure operation of each frame when the successive photographing mode is selected by the photographing-mode selecting unit.

The control unit is preferably arranged to perform the sampling of vibration signals in a period between an end of an exposure operation of each frame and a start of a next exposure operation, including a period of a winding operation of film, in the successive photographing mode. Further, the control unit is preferably constructed of a one-chip microcomputer.

In the second aspect of the present invention as described above, for performing the vibration detection by the vibration detecting unit upon successive photographing in the successive photographing mode, the sampling operation of vibration signals is carried out immediately after completion of the first exposure operation and the sampling is allowed even during the one-frame winding operation of film. Then this operation is repeated between the end of exposure operation of each frame and the start of next exposure operation. This can secure the sampling time before the start of the second or successive exposure operation, and can minimize the time lag upon depression (upon actuation) of the shutter release button.

The above and other objects, features and advantages of the present invention are explained hereinafter and may be better understood by reference to the drawings and the descriptive matter which follows.

DETAILED DESCRIPTION OF THE PREFERRED EMBODIMENTS

Figure 1:
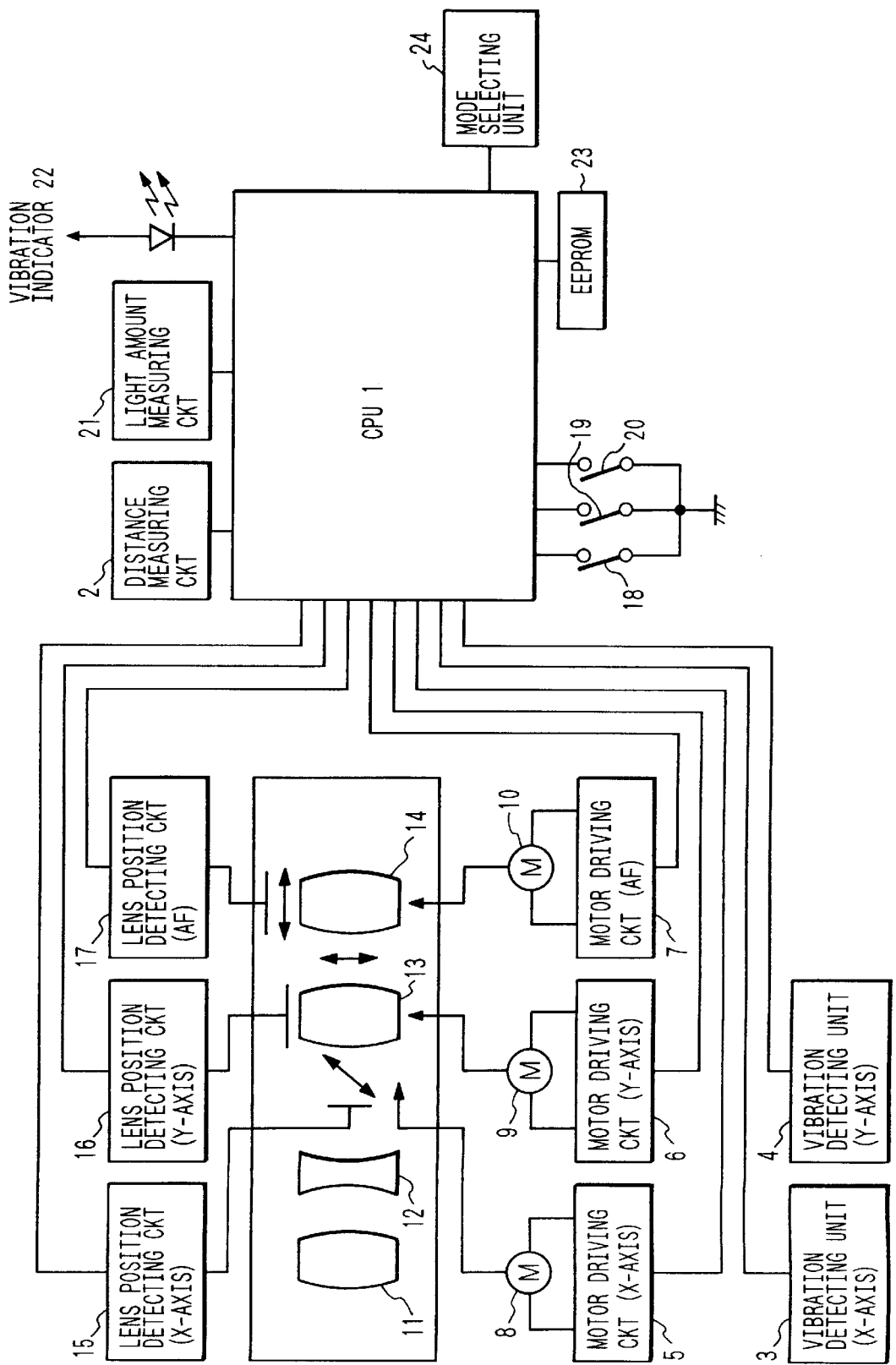
FIG. 1 is a circuit block diagram to show the basic structure of a camera having a vibration correcting function according to the present invention.

FIG. 1 is a circuit block diagram showing the basic structure of the present invention. A photographing lens is composed of four lenses 11, 12, 13, and 14. Among the lenses, the lens 13 is a lens for correction of vibration (hereinafter referred to as a vibration correcting lens 13), which can be driven in the X-axis direction (the longitudinal direction of the camera) and the Y-axis direction (the transverse direction of the camera) for vibration correction.

CPU 1 is a one-chip microcomputer, which is a control unit for controlling the entire sequence of the camera. CPU 1 is provided with various functions, for example, a counter function, a timer function to measure the time, an A/D converting function, etc.

A distance measuring circuit 2 is a circuit for measuring a distance to a subject. A light amount measuring circuit 21 is a circuit for measuring a light amount around the subject. A vibration indicator 22 is for indicating a state of vibration. A main switch 18 is a switch for starting the operation of the camera. The main switch 18 is a momentary switch, and when the main switch 18 is depressed in an off state of the camera, a main switch signal is activated to turn the power supply of the camera on. When the main switch 18 is depressed in an on state of the camera, the main switch signal is also activated to turn the power supply of camera off. A half-depression switch 19 is a switch for starting photographing preparation with half depression of the shutter release button. A release switch 20 is a switch that is turned on with full depression of the shutter release button. A non-volatile memory 23 (EEPROM 23) is a writable non-volatile memory.

A vibration detecting unit 3 is a circuit for detecting an angular velocity of vibration of the camera in the X-axis direction and about the Y axis. A vibration detecting unit 4 is a circuit for detecting an angular velocity in the Y-axis direction and about the X axis. A motor driving circuit 5 is a circuit for controlling a motor 8 for driving the vibration correcting lens 13 in the X-axis direction. A motor driving circuit 6 is a circuit for controlling a motor 9 for driving the vibration correcting lens 13 in the Y-axis direction. A motor driving circuit 7 is a circuit for controlling a motor 10 for AF, which drives a focus lens 14.

A lens position detecting circuit 15 is a circuit for detecting a position (moving amount) in the X-axis direction, of the vibration correcting lens 13. A lens position detecting circuit 16 is a circuit for detecting a position (moving amount) in the Y-axis direction, of the vibration correcting lens 13.

The vibration detecting unit 3 and vibration detecting unit 4 are circuits for correcting the vibration of the camera. The vibration detecting unit 3 and vibration detecting unit 4 have output values changing depending upon an angular velocity caused by the vibration of camera. CPU 1 performs A/D conversion of the output values to detect the angular velocity of vibration. The vibration detecting unit 3 detects an angular velocity in the X direction and about the Y axis while the vibration detecting unit 4 detects an angular velocity in the Y direction and about the X axis.

The motor driving circuit 5 duty-drives the motor 8. The motor driving circuit 6 duty-drives the motor 9. CPU 1 outputs a drive direction signal to each motor driving circuit 5, 6, thereby indicating a drive direction of each motor 8, 9. Further, CPU 1 outputs a drive duty signal to the motor driving circuit 5, 6 to indicate a drive speed of motor 8, 9. The motor driving circuit 5, 6 energizes the motor 8, 9 with arbitrary duty in a designated direction, according to the signals, thereby controlling the vibration correcting lens 13 at arbitrary speed. CPU 1 executes arithmetic operation of measured distance data obtained by the distance measuring circuit 2. According to the result of this arithmetic operation, CPU 1 gives an instruction to the motor driving circuit 7. The motor driving circuit 7 energizes the motor 10 in the direction designated by CPU 1, thereby controlling the focus lens 14 at arbitrary speed.

While rotation of motor 8 is converted into a linear motion by a mechanical system (not shown) for driving the correcting lens, the vibration correcting lens 13 is driven in the X-axis direction. While rotation of motor 9 is converted into a linear motion by a mechanical system (not shown) for driving the correction lens, the vibration correcting lens 13 is driven in the Y-axis direction. While rotation of motor 10 is converted into a linear motion by a mechanical system (not shown) for driving the focus lens, the focus lens 14 is driven in the optical-axis direction.

The lens position detecting circuit 15 outputs pulses according to a moving amount in the X-axis direction, of the vibration correcting lens 13. CPU 1 counts a number of the pulses, thereby reading positions and moving amounts in the X-axis and Y-axis directions. Also, CPU 1 calculates moving speeds in the X-axis and Y-axis directions by detecting moving amounts during a certain selected time period. The lens position detecting circuit 17 outputs pulses according to a moving amount in the optical-axis direction, of the focus lens 14. CPU 1 counts a number of the pulses, thereby reading the position and moving amount in the optical-axis direction, of the focus lens 14.

EEPROM 23 is a non-volatile memory in which predetermined data necessary for photographing processing is preliminarily written. When a need occurs in performing predetermined sequence, CPU 1 reads the predetermined data out of EEPROM 23.

A mode selecting unit 24 is a unit for a photographer to select a photographing mode, by which a successive photographing mode, a self mode, etc. can be selected.

Now, the photographing operation by the respective circuits is next described with the camera having the vibration correcting function according to the above structure.

Namely, the X-axis and Y-axis vibration detecting units 3, 4 as described above are circuits for detecting the vibration of camera, which are arranged to output a signal of an angular velocity caused about the X axis and a signal of an angular velocity caused about the Y axis, respectively, as the vibration of camera. Then CPU 1 executes the A/D conversion of output values to detect the angular velocities of the vibration.

The motor driving circuit 5 duty-drives the motor 8. Further, the motor driving circuit 6 duty-drives the motor 9. Then CPU 1 outputs drive direction signals to the motor driving circuits 5, 6 to give instructions about drive directions of the respective motors 8, 9.

Further, CPU 1 outputs drive duty signals to the motor driving circuits 5, 6 to give instructions about drive speeds of the respective motors 8, 9. According to the signals, the motor driving circuits 5, 6 energize the motors 8, 9 each at arbitrary duty in a designated direction, thereby controlling the vibration correcting lens 13 at arbitrary speed.

Meantime, CPU 1 executes the arithmetic operation of measured distance data obtained by the distance measuring circuit 2. According to the result of the arithmetic operation, CPU 1 gives an instruction to the motor driving circuit 7. The motor driving circuit 7 energizes the motor 10 in the designated direction by CPU 1, thereby controlling the focus lens 14 at arbitrary speed.

The rotation of motor 8 is converted into a linear motion by the drive mechanical system (not shown) of the vibration correcting lens 13, thereby driving the vibration correcting lens 13 in the X-axis direction. Also, the rotation of motor 9 is converted into a linear motion by the drive mechanical system (not shown) of the vibration correcting lens 13, thereby driving the vibration correcting lens 13 in the Y-axis direction.

Further, the rotation of motor 10 is converted into a linear motion by the drive mechanical system (not shown) of the focus lens 14, thereby driving the focus lens 14 in the optical-axis direction.

Also, the lens position detecting circuits 15, 16 output pulses according to the moving amounts in the X-axis and Y-axis directions, of the vibration correcting lens 13. Then CPU 1 counts the number of the pulses, thereby reading the positions and moving amounts in the X-axis and Y-axis directions.

Further, CPU 1 calculates the moving speeds in the X-axis and Y-axis directions by detecting respective moving amounts during a constant time period.

Also, the lens position detecting circuit 17 outputs pulses according to the moving amount in the optical-axis direction of the focus lens 14. Then CPU 1 counts the number of the pulses, thereby reading the position and moving amount in the optical-axis direction of the focus lens 14.

Figure 2:
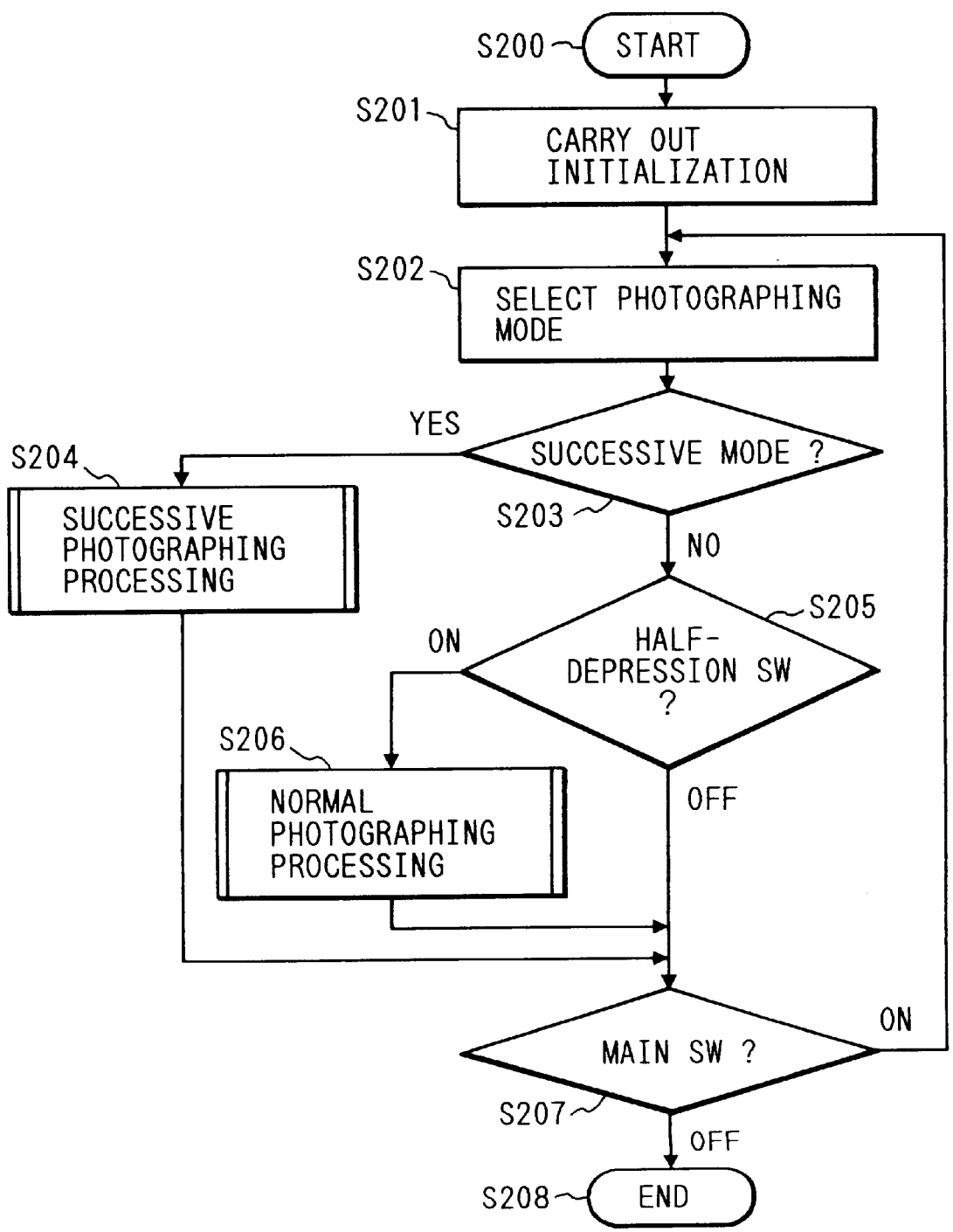
FIG. 2 is a flowchart to show a main flow of control in the camera having the vibration correcting function according to the present invention.

FIG. 2 is a flowchart to show the main flow of control in the camera having the vibration correcting function according to the present invention. Suppose the power is already put in, the main switch 18 is already turned on, and processing is started from S200. First, the inside of CPU 1 is initialized at S201. Next, the photographer selects a photographing mode through the mode selecting unit 24 at S202. Then it is determined at S203 whether the successive photographing mode is selected. If the successive photographing mode is selected then the flow proceeds to S204 to execute the successive photographing processing. After completion of the successive photographing processing, the flow goes to S207; if the main switch 18 is off at S207 then the flow goes to S208 to end the processing. If the control unit determines at S203 that the successive photographing mode is not selected and if the half-depression switch 19 is off at S205, the flow proceeds to S207. If the main switch 18 is off at S207 then the flow proceeds to S208 to end the processing. If the main switch 18 is on at S207 then the processing from S200 is again started. If the half-depression switch 19 is on at S205, the flow goes to S206 to call the normal photographing processing. After completion of the normal photographing processing, the flow proceeds to S207. If the main switch 18 is off at S207 then the flow goes to S208 to end the processing.

The operation of the first embodiment of the present invention is next described using the flowcharts shown in FIG. 2 to FIG. 4B. Control programs of these flowcharts are set in CPU 1.

Let us suppose here in the present embodiment that an execution time of distance measurement of the distance measuring circuit 2 is 0 to 300 ms, that an execution time of light amount measurement of the light amount measuring circuit 21 is 50 ms, that the drive time of the focus lens 14 is 100 ms, that the circuit stabilizing time of the vibration detecting units 3, 4 is 300 ms, that a shock avoiding time upon release is 50 ms, that the time of zero detection of angular velocity is 900 ms, and that a control time of approach run for stabilizing the vibration correcting control is 20 ms.

When it is affirmed at S205 that the half-depression switch 19 is on, the normal photographing processing is started from S300 in FIG. 3A. First, the vibration detecting unit 3 and vibration detecting unit 4 are started at S301. A timer A (the time of zero detection of angular velocity: 900 ms in the present embodiment) is started at next S302, and flag A is set to 0 at S303. Next, the light amount measuring processing is executed at S304 and the distance measuring processing is executed at S305.

After that, a result of the light amount measurement executed at S304 is subjected to the AE operation at S306, and the FM operation is carried out at S307, utilizing a result of the distance measurement executed at S305. At next S308 a wait time of T1 is necessitated in order to secure the circuit stabilizing time of the vibration detecting units. In the present embodiment, T1 is 250 ms, because 0 to 250 ms is obtained when the distance measuring time 0 to 300 ms and the light amount measuring time 50 ms are subtracted from the stabilizing time of vibration detecting units, 300 ms. At S309 the focus lens 14 is driven to a predetermined drive destination according to a measured distance value set at S305.

At next S310 it is determined whether or not an output from the vibration detecting unit 3, 4, which indicates a vibration amount, is smaller than a predetermined value C. When it is affirmed at S310 that the vibration amount is smaller than the predetermined value C, an indication of the vibration indicator 22 is made on at S311 and then the flow proceeds to S401 in FIG. 3B. The indication of the vibration indicator 22 thus made on indicates that the vibration amount detected is within a correctable range.

Figure 3B:
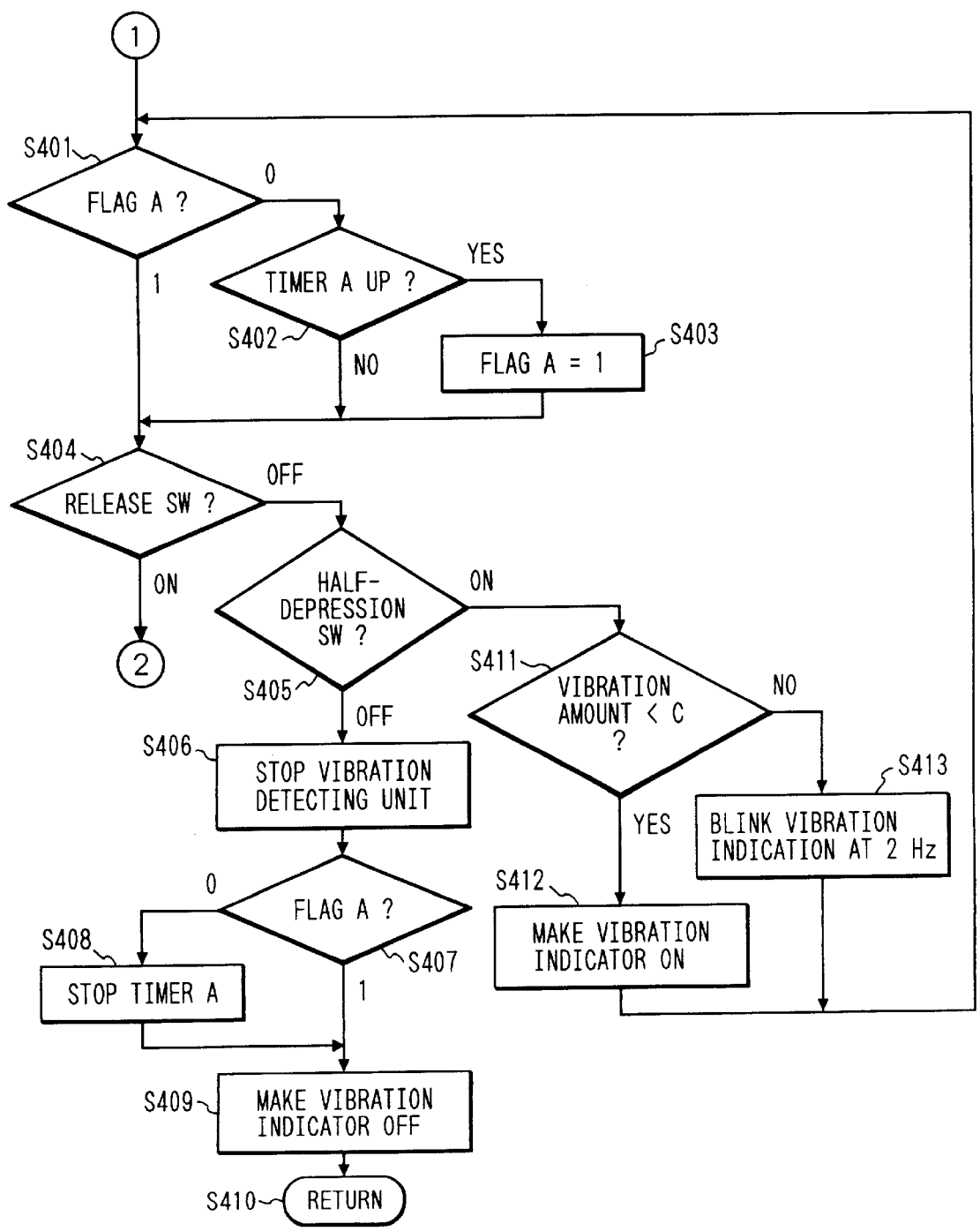
FIG. 3 is comprised of FIG. 3A, FIG. 3B, and FIG. 3C and illustrates flowcharts to show procedures of normal photographing processing in the first embodiment of the present invention.

If it is determined at S310 that the vibration amount exceeds the predetermined value, the indication of the vibration indicator 22 is made to blink at 2 Hz at S312 and then the flow proceeds to S401 in FIG. 3B. The blinking indication at 2 Hz, of the vibration indicator 22 indicates that the vibration amount is too large to assure satisfactory vibration correction.

The flag A is checked at S401 in FIG. 3B, and the flow proceeds to S402 when the flag A is "0" as executed at S303.

When it is determined at S401 that the flag A is set to "1," the flow goes to S404.

When time-up of timer A is confirmed at S402 (or when the time of zero detection of angular velocity, 900 ms in the present embodiment, has elapsed), the flag A is set to "1" at S403 and then the flow goes to S404.

Figure 3C:
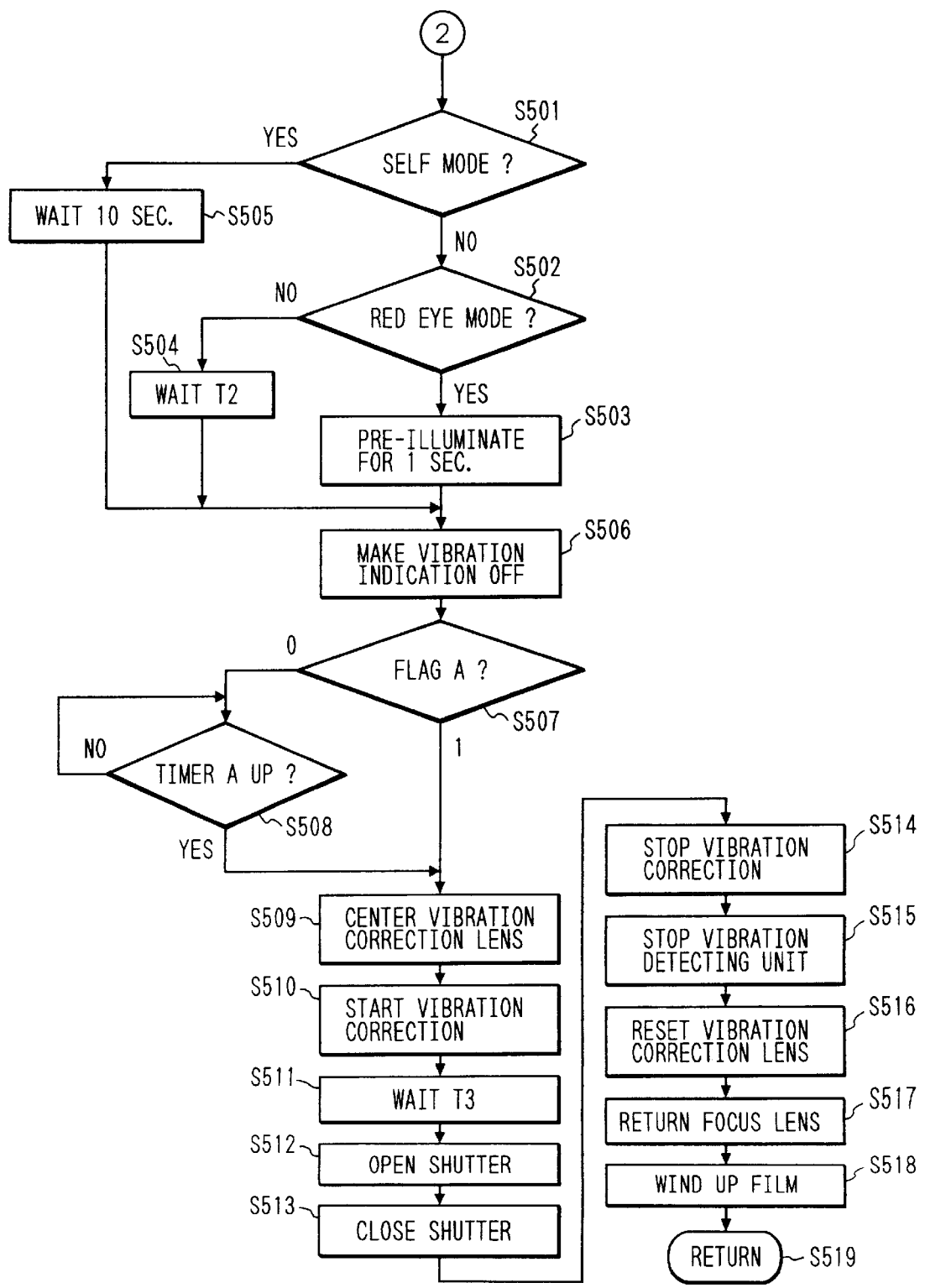

It is determined at S404 whether the release switch 20 is on, and if on, the flow goes to S501 in FIG. 3C. If the release switch 20 is off at S404 then it is determined at S405 whether the half-depression switch is on.

If it is determined at S405 that the half-depression switch 19 is off, the vibration detecting units 3, 4 are stopped at S406. Then the flag A is checked at S407. If it is "1" then the flow goes to S409; if it is "0" then the timer A is stopped at S408 and then the flow proceeds to S409. The indication of the vibration indicator is made off at S409 and then the flow returns from S410 to the flowchart of FIG. 2. In this case, photographing is not carried out.

When actuation of the half-depression switch 19 is affirmed at S405 and if the output from the vibration detecting unit 3, 4, which is a vibration amount, is smaller than the predetermined value next at S411, the vibration indicator 22 is turned on at S412 and then the flow returns to S401.

If it is determined at S411 that the vibration amount is greater than the predetermined value C, the indication of the vibration indicator 22 is made to blink at 2 Hz at S413 and then the flow returns to S401.

It is determined at S501 in FIG. 3C whether or not the self mode is selected. If it is selected, a lapse of a selected time (for example, 10 seconds) of the self timer is awaited at S505 and then the flow proceeds to S506.

If the self mode is not selected at S501 it is determined at S502 whether or not a red eye mode is selected. If it is not selected a lapse of a wait time (which is the shock avoiding time at release, 50 ms in the present embodiment) of T2 is awaited at S504 and then the flow goes to S506. If the red eye mode is selected at S502 preliminary illumination for one second is set at S503 and then the flow goes to S506.

At S506 the indication of the vibration indicator 22 lit at S311, S312, S412, or S413 is made off, and then the flow goes to S507.

The state of flag A is checked at S507, and if it is "1" then the flow goes to S509. If it is "0" at S507, next S508 awaits time-up of the timer A started at S302, and after a lapse of the time, the flow proceeds to S509.

At S509 the vibration correcting lens 13 is moved so that the center of the vibration correcting lens 13 comes to the center position of the optical axis from the initial reset position. The vibration correction is started at S510, and the flow proceeds to S512 after a lapse of a wait time of T3 (which is an approach run control time for stabilizing the vibration correction control, 20 ms in the present embodiment) at S511.

At S512 the shutter starts opening. The vibration correction processing is continued from S510 before the shutter starts opening to S514 immediately after the shutter is closed. At S512 the shutter is kept open for a predetermined time at EV value according to the AE operation value obtained at S306. After that, the shutter is closed at S513, and the vibration correction processing is stopped at S514. Next, the vibration detecting units 3, 4 are stopped at S515. Then the vibration correcting lens 13 is returned to the initial position at S516, and the focus lens 14 is driven to a predetermined reset position at S517. Then the film is wound up at S518, and then the flow returns to the flowchart of FIG. 2 from S519.

Figure 4B:
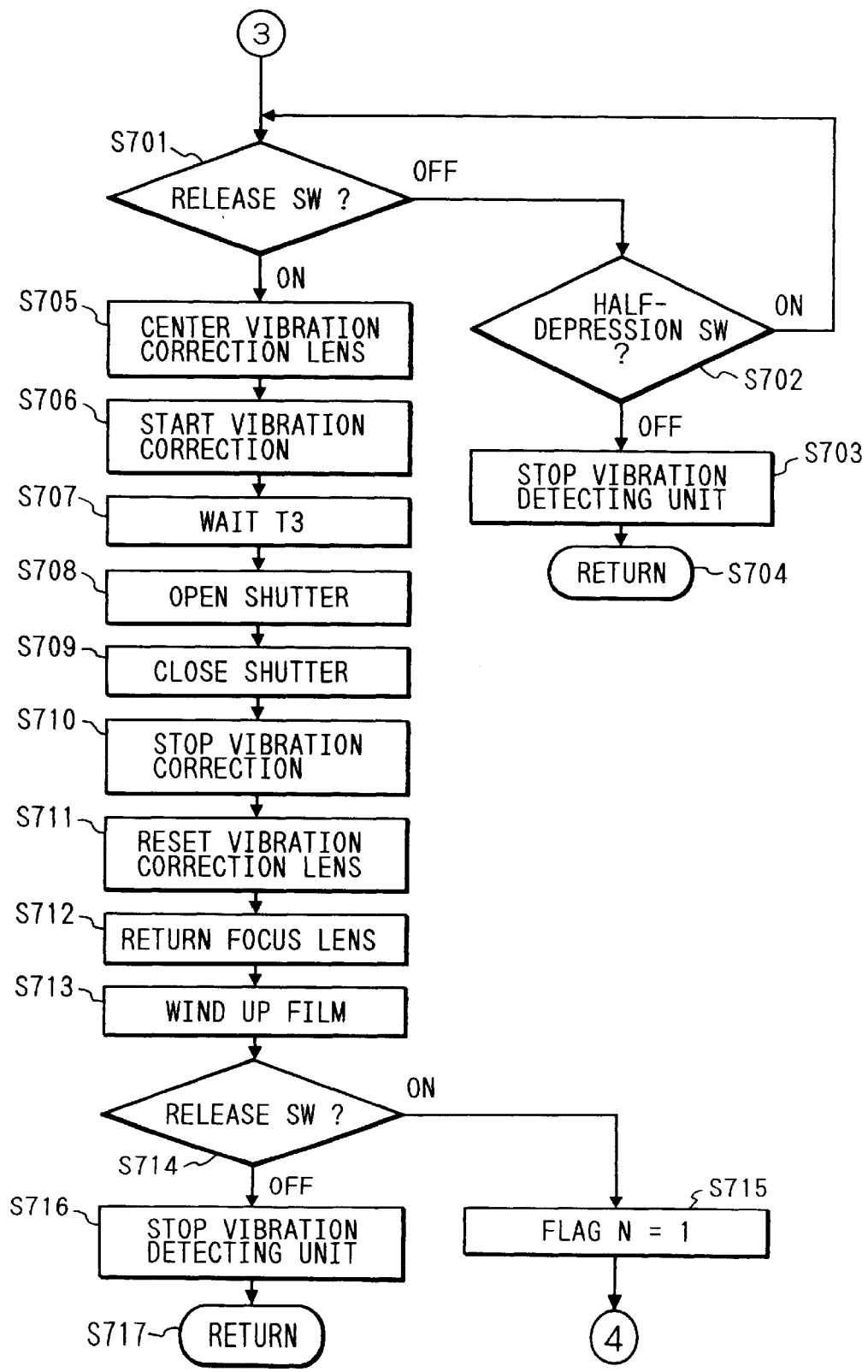
FIG. 4 is comprised of FIG. 4A and FIG. 4B and illustrates flowcharts to show procedures of successive photographing processing in the first embodiment of the present invention.

FIGS. 4A and 4B show the flowcharts of the successive photographing processing. This successive photographing processing is executed when it is determined at S203 in the main flow of FIG. 2 that the successive photographing mode is selected.

The half-depression switch is checked at S601. If the half-depression switch 19 is off, the flow goes to S602 then to return to the main flow. If the half-depression switch 19 is on at S601, a flag N is set to "0" at S603 and then the vibration detecting unit 3 and vibration detecting unit 4 are started at S604.

Whether the flag N is "0" is checked next at S605. If N is "0" the flow goes to S606. If N is not "0" at S605 the flow proceeds to S608 without starting the timer A and without taking the wait time of T1. The timer A (which is the time of zero detection of angular velocity, 900 ms in the present embodiment) is started at S606, and the wait time of T1 at S607 is necessary for securing the circuit stabilizing time of the vibration detecting units. In the present embodiment, T1 is 250 ms, because 0 to 250 ms is obtained when the distance measuring time 0 to 300 ms and the light amount measuring time 50 ms are subtracted from the stabilizing time 300 ms of the vibration detecting units. Next, the light amount measuring processing is executed at S608 and the distance measuring processing at S609.

After that, a result of the light amount measurement executed at S608 is subjected to the AE operation at S610, and the FM operation is carried out at S611, utilizing a result of the distance measurement executed at S609. At S612 the focus lens 14 is driven to a predetermined drive destination according to the measured distance value set at S305.

Next, whether the flag N is "0" is checked at S613. If it is "0" the flow goes to S614 to determine whether or not the time of the timer A is up. If the time of the timer A is not up yet then the time-up is awaited. After the time is up, the flow goes to S701. If the flag N is not "0" at S613 the flow goes to S701 without checking the timer.

It is determined at S701 whether the release switch 20 is on. If it is off the flow goes to S702 to check whether the half-depression switch is on. If the half-depression switch 19 is on at S702 the flow again returns to S701 to determine whether the release switch 20 is on or off. If the half-depression switch is off at S702 the vibration detecting units are stopped at S703 and the flow leaves the successive photographing processing at S704.

If the release switch 20 is on at S701 the flow proceeds to S705. At S705 the vibration correcting lens 13 is moved so that the center of the vibration correcting lens 13 comes to the center position of the optical axis from the initial reset position. The vibration correction is started at S706 and after a lapse of the wait time of T3 (which is the approach run control time for stabilizing the vibration correction control, 20 ms in the present embodiment) at S707, the flow goes to S708.

The shutter starts opening at S708.

The vibration correction processing is continued from S706 before the shutter starts opening at S708 to S710 immediately after the shutter is closed at S709. At S708 the shutter is opened for a predetermined time at the EV value according to the AE operation value obtained at S608. After that, the shutter closing processing is executed at S709, the vibration correction processing is stopped at S710, the vibration correcting lens 13 is returned to the initial position at S711, and the focus lens 14 is driven at S712 to the predetermined reset position. Next, the film is wound up by a frame at S713, and whether the release switch 20 is on is determined at S714. If the release switch 20 is on then the flag N is set to "1" at S715, and again returning to S605, photographing is started again. If the release switch 20 is off at S714 the flow proceeds to S716 to stop the vibration detecting units 3, 4 and then to return to the main flow from S716.

The operation of the second embodiment of the present invention is next described using the flowcharts shown in FIG. 2, FIGS. 5A to 5C, and FIGS. 6A to 6C. Control programs of these flowcharts are set inside CPU 1.

Let us suppose here in the present embodiment that the distance measurement execution time of the distance measuring circuit 11 is 0 to 300 ms, that the light amount measurement execution time of the light amount measuring circuit 12 is 50 ms, that the drive time of the focus lens 14 is 100 ms, that the circuit stabilizing time of the angular velocity detecting circuits 21, 22 is 300 ms, that the shock avoiding time at release is 50 ms, that the time of zero detection of angular velocity is 900 ms, and that the approach run control time for stabilizing the vibration correction control is 20 ms.

When actuation of the half-depression switch 19 is confirmed at S205 (FIG. 2) the normal photographing processing is started from S800 in FIG. 5A.

First, the vibration detecting units 3 and 4 are started at S801.

At next S802 the sampling operation of vibration signals for detecting the zero state of the angular velocity is started in order to detect the absolute value of vibration in camera. Then the timer A' (which counts the time of zero detection of angular velocity, 900 ms in the present embodiment) is started at next S803, and a flag A' is set to "0" at S804.

Next, the light amount measuring processing is executed by the light amount measuring circuit 21 at S805 and the distance measuring processing is executed by the distance measuring circuit 2 at S806.

After that, a result of the light amount measurement executed at S805 is subjected to the AE operation at S807, and the FM operation is carried out at S808, utilizing a result of the distance measurement executed at S806.

Next at S809, a wait time of T1' is a time necessary for securing the circuit stabilizing time of the vibration detecting units 3, 4 as a vibration detecting apparatus. In the present embodiment, T1' is 250 ms, because 0 to 250 ms is obtained when the distance measuring time 0 to 300 ms and the light amount measuring time 50 ms are subtracted from the stabilizing time 300 ms of the vibration detecting units 3, 4.

At S810 the focus lens 14 is driven to a predetermined drive destination according to the measured distance value set at S806.

At next S811 it is determined whether an output from the vibration detecting unit 3, 4, which is the vibration amount, is smaller than a predetermined value C'.

Figure 5B:
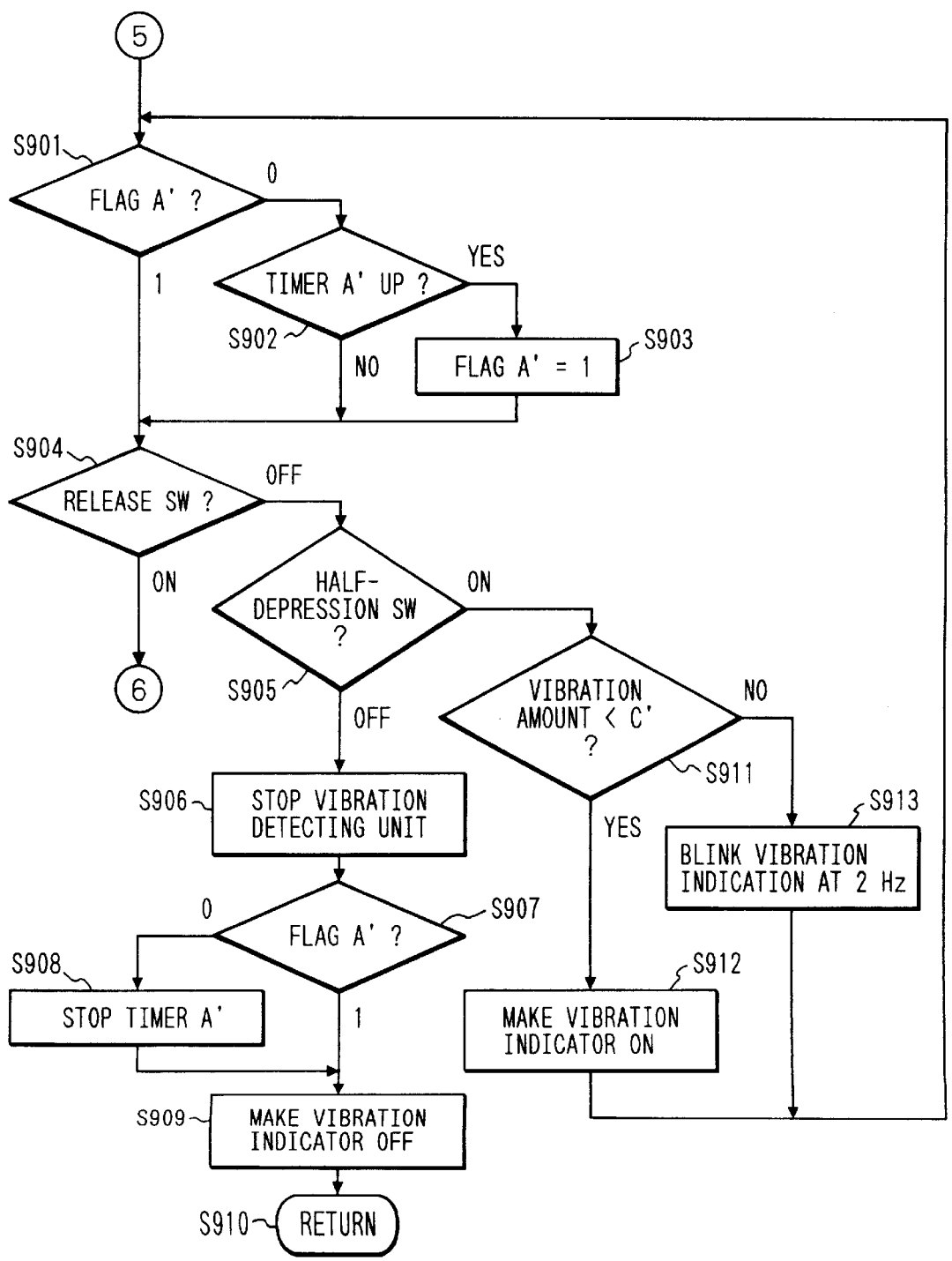
FIG. 5 is comprised of FIG. 5A, FIG. 5B, and FIG. 5C and illustrates flowcharts to show procedures of normal photographing processing in a second embodiment of the present invention.

If it is determined at S811 that the vibration amount is smaller than the predetermined value C', the indication of the vibration indicator 22 is made on at S812 and then the flow goes to S901 in FIG. 5B. Here, the lighting indication of the vibration indicator 22 indicates that the vibration amount detected is within a correctable range.

If it is determined at S811 that the vibration amount is greater than the predetermined value, the indication of the vibration indicator 22 is made to blink at 2 Hz at S813 and then the flow goes to S901 in FIG. 5B. The blinking indication at 2 Hz, of the vibration indicator 22 indicates that the vibration amount detected is too large to assure satisfactory vibration correction.

The flag A' is checked at S901 in FIG. 5B, and if the flag A' is "0" as executed at S804 then the flow goes to S902.

If it is determined at S901 that the flag A' is set to "1", then the flow goes to S904.

When that the time of timer A' is up is confirmed (or when the time of zero detection of angular velocity, 900 ms in the present embodiment, has elapsed) at S902, the flag A' is set to "1" at S903 and then the flow goes to S904.

At S904 it is determined whether the release switch 20 is on. If it is on, the flow goes to S1001 in FIG. 5C.

If the release switch 20 is off at S904, whether the half-depression switch 19 is on is determined next at S905.

When it is determined at S905 that the half-depression switch 19 is off, the vibration detecting units 3, 4 are stopped at S906. After that, the flag A' is checked at S907, and if it is "1" the flow goes to S909. If it is "0" the timer A' is stopped at S908 and thereafter the flow goes to S909.

The indication of the vibration indicator 22 is turned off at S909, and thereafter the flow returns to the flowchart of FIG. 2 from S910. In this case, photographing is not carried out.

On the other hand, if actuation of the half-depression switch 19 is confirmed at S905, the flow goes to next S911. If it is determined there that the output from the vibration detecting unit 3, 4, which is the vibration amount, is smaller than the predetermined value, the indication of the vibration indicator 22 is made on at S912 and then the flow returns to S901.

If it is determined at S911 that the vibration amount exceeds the predetermined value C', the indication of the vibration indicator 22 is made to blink at 2 Hz at S913 and then the flow returns to S901.

Figure 5C:
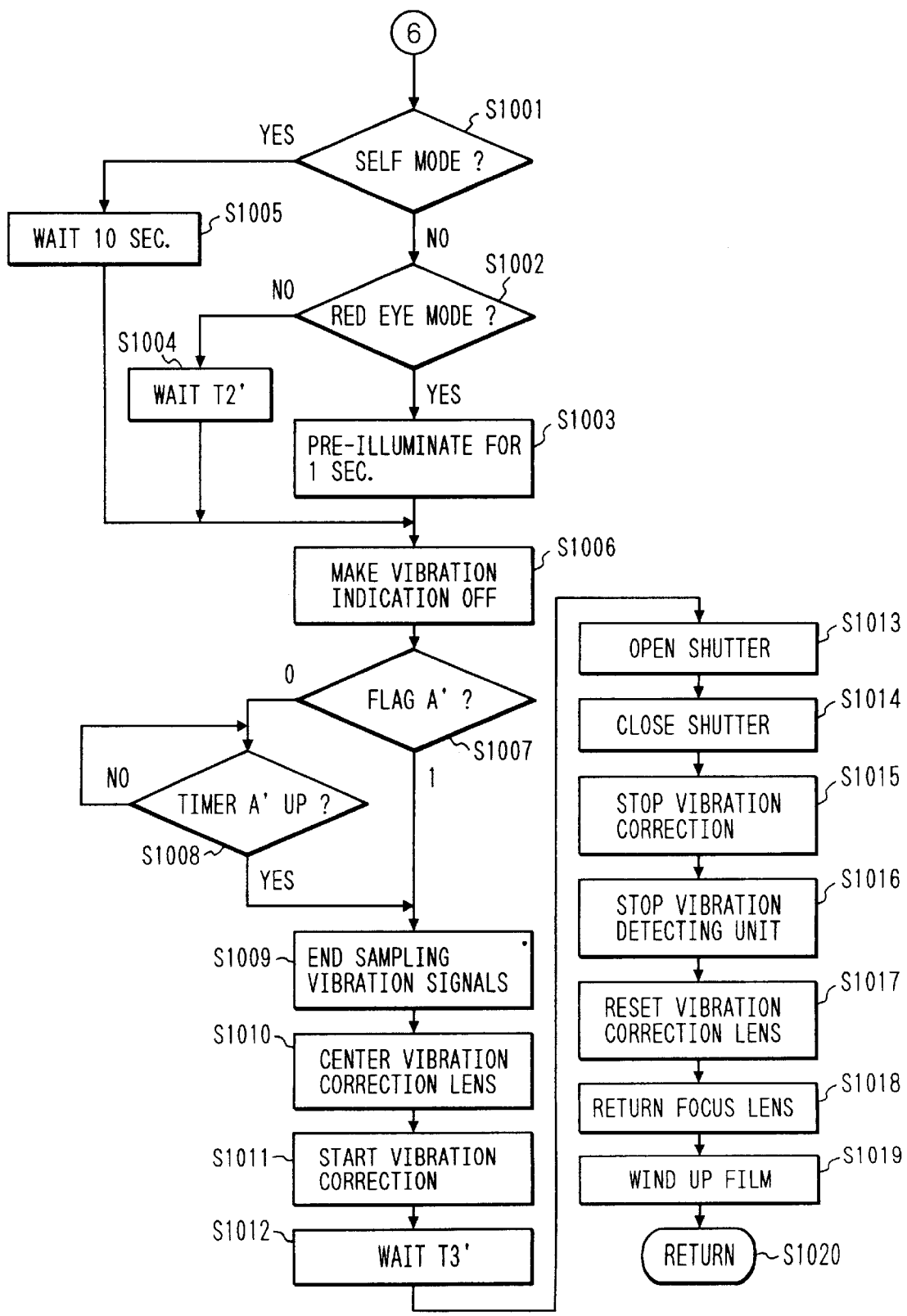

In FIG. 5C, it is determined at S1001 whether or not the selected mode by the photographing-mode selecting unit 24 is the self mode. If it is affirmed, a lapse of the time of the self timer (for example, 10 seconds) is awaited at S1005 and then the flow proceeds to S1006.

If the answer is no at S1001, it is determined at S1002 whether the selected mode is the red eye mode. If the answer is no at S1002, a lapse of the wait time of T2' (which is the shock avoiding time at release, 50 ms in the present embodiment) is awaited at S1004 and then the flow proceeds to S1006.

When the red eye mode is confirmed at S1002, a flash device (not shown) is activated for preliminary illumination for one second at S1003, and then the flow goes to S1006.

At S1006, the indication of the vibration indicator 22 lit at S812 or S813 in FIG. 5A, or at S912 or S913 in FIG. 5B is turned off, and then the flow proceeds to S1007.

The state of the flag A' is checked at S1007. If it is "1" then the flow goes to S1009. If "0" is determined at S1007, time-up of the timer A' started at S803 is awaited at next S1008, and after a lapse of the time, the flow goes to S1009 to end the sampling of vibration signals started at S803 and then to calculate the reference signal level where the angular velocity of vibration becomes zero. Then the flow goes next to S1010.

At S1010 the vibration correcting lens 13 is moved so that the center of the vibration correcting lens 13 comes to the center position of the optical axis from the initial reset position. Then the vibration correction is started at S1011, and after a lapse of a wait time of T3' (which is the approach run control time for stabilizing the vibration correction control, 20 ms in the present embodiment) at S1012, the flow goes to S1013.

The shutter starts opening at this S1013.

The vibration correction processing is continued from S1011 before the shutter starts opening to S1015 immediately after the shutter is closed. At S1013 the shutter is opened for a predetermined time at the EV value according to the AE operation value obtained at S807 as described above.

After that, the shutter closing processing is carried out at S1014 and the vibration correction processing is stopped at S1015. Next, the vibration detecting units 3, 4 are stopped at S1016.

Further, the vibration correcting lens 13 is returned to the initial position at next S1017, and the focus lens 14 is driven to the predetermined reset position at S1018. At next S1019 the film is wound up and then the flow returns to the flowchart of FIG. 2 from S1020.

Figure 6B:
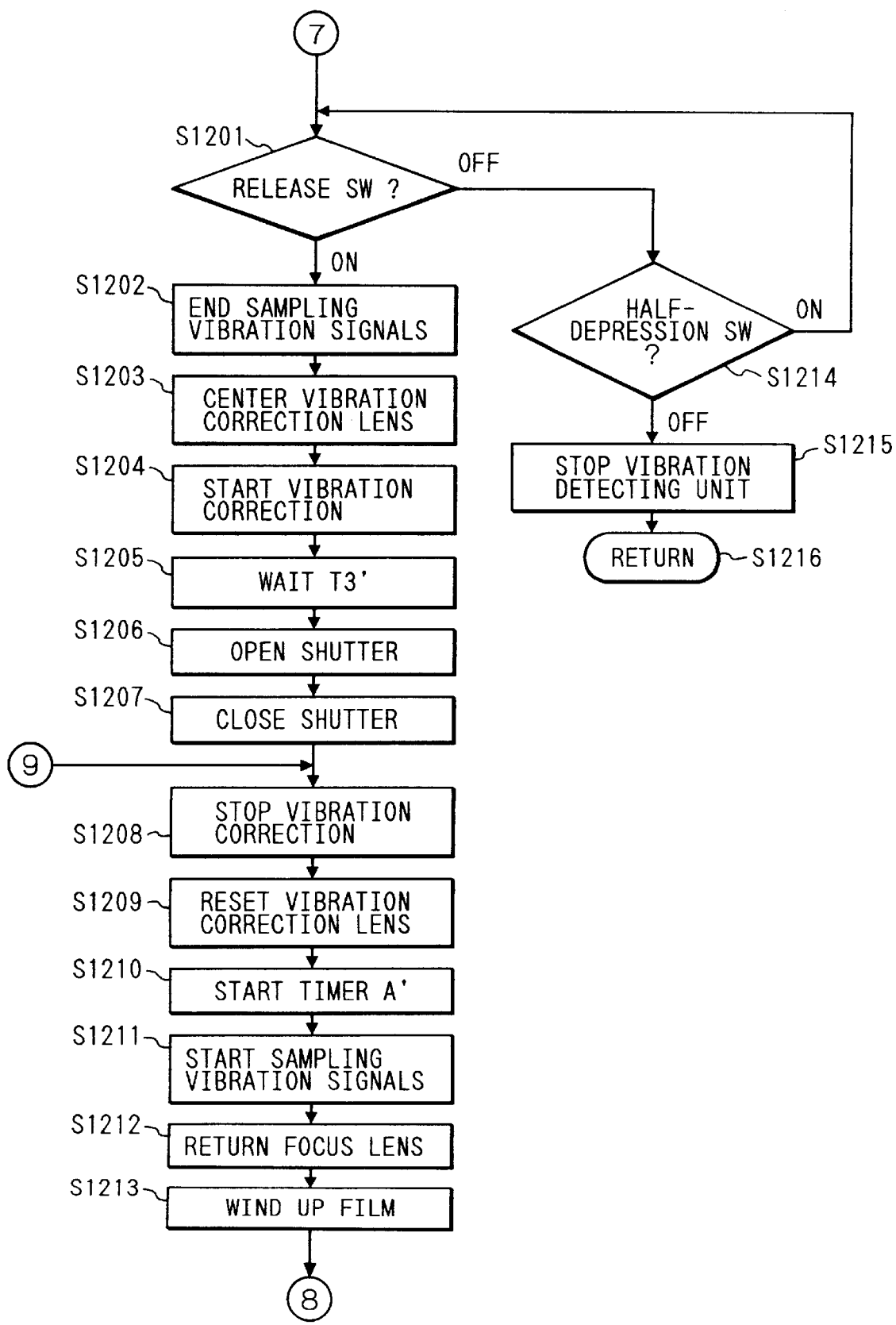
FIG. 6 is comprised of FIG. 6A, FIG. 6B, and FIG. 6C and illustrates flowcharts to show procedures of successive photographing processing in the second embodiment of the present invention.
Figure 6C:
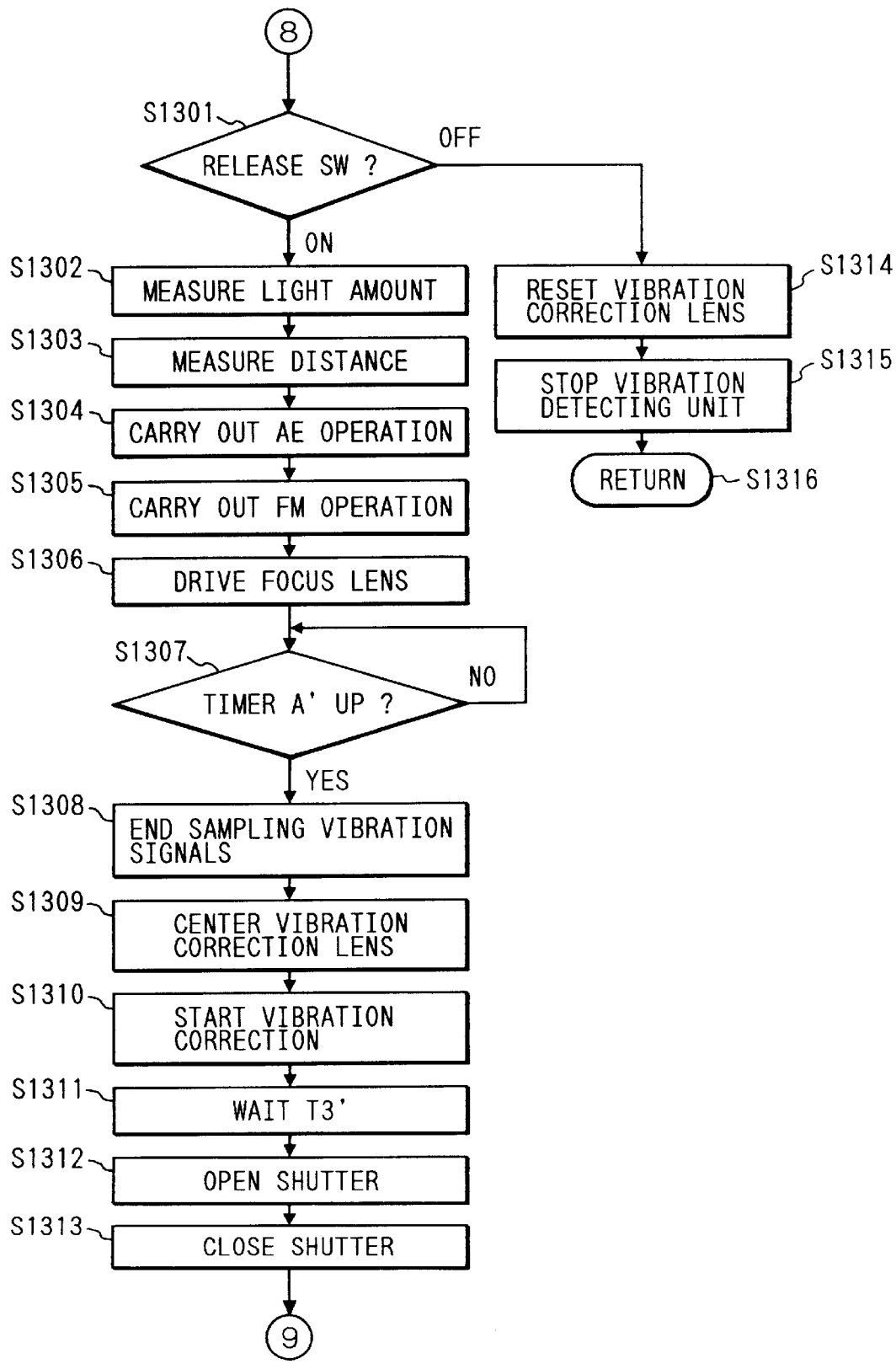

FIGS. 6A to 6C show the flowcharts of the successive photographing processing where photographing is carried out in the successive photographing mode.

Namely, when it is determined at S203 in the main flow of FIG. 2 that the successive photographing mode is selected, this successive photographing processing at S204 is started.

The half-depression switch 19 is checked at S1101, and if the half-depression switch 19 is off the flow goes to S1102 and then returns to the main flow of FIG. 2.

If the half-depression switch 19 is on at S1101, a flag N' is set to "0" at S1103. Then the vibration detecting unit 3 and vibration detecting unit 4 are started at S1104, and the sampling operation of vibration signals for detecting the zero state of angular velocity is started in order to detect the absolute amount of vibration at S1105.

It is determined next at S1106 whether or not the flag N' is "0". If it is not "0", the flow goes to S1109; if it is "0" the timer A' (which counts the time of zero detection of angular velocity, 900 ms in the present embodiment) is started at S1107.

At next S1108 the wait time of T1' is the time necessary for securing the circuit stabilizing time of the vibration detecting units 3, 4. In the present embodiment, T1' is 250 ms, because 0 to 250 ms is obtained when the distance measuring time 0 to 300 ms and the light amount measuring time 50 ms are subtracted from the circuit stabilizing time 300 ms of the vibration detecting units.

Next, the light amount measuring processing is executed at S1109 and the distance measuring processing is executed at S1110.

After that, a result of the light amount measurement executed at S1109 is subjected to the AE operation at S1111, and at S1112 the FM operation is carried out utilizing a result of the distance measurement executed at S1110.

At S1113 the focus lens 14 is driven to a predetermined drive destination according to the measured distance value set at S1110.

Whether the flag N' is "0" is determined at S1114. If it is not "0" the flow goes to S1201; if it is "0" whether the time of the timer A' is up is determined at S1115. If the count of the timer A' is not up yet the time-up thereof is awaited. After completion of count, the flow proceeds to S1201 in FIG. 6B.

It is determined at S1201 whether the release switch 20 is on. If it is off the flow proceeds to S1214 to determine whether the half-depression switch 19 is on.

If the half-depression switch 19 is on at this S1214, the flow again returns to S1201 to determine whether the release switch 20 is on or off.

If the half-depression switch 19 is off at S1214, the vibration detecting units 3, 4 are stopped at S1215 and the flow returns to the main flow at S1216 to leave the successive photographing processing.

On the other hand, if the release switch 20 is on at S1201, the flow goes to S1202 to end the sampling of vibration signals started at S1105 and then to calculate the reference signal level where the angular velocity of vibration becomes zero.

Next at S1203 the vibration correcting lens 13 is moved so that the center of the vibration correcting lens 13 comes to the center position of the optical axis from the initial reset position. Then the vibration correction is started at S1204, and after a lapse of the wait time of T3' (which is the approach run control time for stabilizing the vibration correction control, 20 ms in the present embodiment) at S1205, the flow proceeds to S1206.

At S1206 the unrepresented shutter starts opening.

The vibration correction processing is continued from S1204 before the shutter starts opening to S1208 immediately after the shutter is closed.

Here, the shutter is opened for a predetermined time at the EV value according to the AE operation value obtained at S1109 and S1111. After that, the shutter closing processing is carried out at S1207; further, the vibration correction processing is stopped at S1208; and the vibration correcting lens 13 is moved to the reset position at S1209.

Then the timer A' (the time of zero detection of angular velocity, 900 ms in the present embodiment) is started at S1210, and the sampling operation of vibration signals for detecting the zero state of the angular velocity is again started in order to detect the absolute value of vibration at S1211.

At S1212 the focus lens 14 is driven to the predetermined reset position. Next at S1213 the film is wound up by a frame, and whether the release switch 20 is on is determined at S1301 in FIG. 6C.

If the release switch 20 is on the light amount measuring processing is executed at S1302, and further, the distance measurement processing is executed at S1303.

After that, a result of the light amount measurement executed at S1302 is subjected to the AE operation at S1304, and at S1305 the FM operation is carried out utilizing a result of the distance measurement executed at S1303.

At S1306 the focus lens 14 is driven to a predetermined drive destination according to the measured distance value set at S1303.

It is determined at S1307 whether the time of timer A' is up. If the count of the timer A' is not up yet, the time-up is awaited. After completion of counting, the flow goes to S1308.

At this S1308 the sampling of vibration signals started at S1211 is ended and the reference signal level where the angular velocity of vibration becomes zero is calculated.

Next, at S1309 the vibration correcting lens 13 is moved so that the center of the vibration correcting lens 13 comes to the center position of the optical axis from the initial reset position.

Then the vibration correction is started at S1310, and after a lapse of the wait time of T3' (which is the approach run control time for stabilizing the vibration correction control, 20 ms in the present embodiment) at S1311, the flow goes to S1312. At S1312 the shutter (not shown) starts opening.

The vibration correction processing is continued from S1308 before the shutter starts opening to S1208 immediately after the shutter is closed. Then the shutter is opened for the predetermined time at the EV value according to the AE operation value obtained at S1304.

After that, the shutter closing processing is carried out at S1313, and then the flow returns to S1208 in FIG. 6B.

On the other hand, if the release switch 20 is off at S1301 in FIG. 6C, the vibration correcting lens 13 is reset at S1314, then the vibration detecting units 3, 4 are stopped at S1315, and the flow returns to the main flow of FIG. 2 from S1316.

It is needless to mention that the present invention is by no means limited to the above-described structures in the embodiments, but shapes, arrangements, etc. of the various portions in the camera having the vibration correcting function and in the vibration correcting mechanism can be properly modified or changed with necessity.

What is claimed is:

1. A camera having a vibration correcting function comprising:
    a vibration detecting unit to detect vibration;
    a vibration correcting unit to correct vibration in photographing, based on a signal detected by said vibration detecting unit;
    a photographing-mode selecting unit to select either a normal photographing mode or a successive photographing mode;
    a shutter unit to open and close a shutter to perform an exposure operation of a photographic frame;
    a film wind-up unit including an electric motor to wind up film by using said electric motor; and
    a control unit to start a vibration correction operation by said vibration correcting unit before opening of said shutter for each respective frame, and to stop the vibration correction operation by said vibration correcting unit, immediately after closure of said shutter to compete an exposure operation of a frame, and then to start a sampling operation for sampling vibration signals to calculate a reference level to be used for a vibration correction operation during an exposure operation of a subsequent frame, before beginning to wind the exposed frame of the film by said film wind-up unit so that the subsequent frame is in a state capable of being exposed, and to stop the sampling operation before start of the vibration correction operation for the exposure operation of the subsequent frame, when said successive photographing mode is selected by said photographing-mode selecting unit.

2. A camera according to claim 1, wherein a period for sampling vibration signals is constant in each sampling operation.

3. A method for controlling a camera having a vibration correcting function, the camera comprising a vibration detecting unit to detect vibration, a vibration correcting unit to correct vibration in photography, based on a signal detected by said vibration detecting unit, a photographing-mode selecting unit to select either a normal photographing mode or a successive photographing mode, a shutter unit to open and close a shutter so as to perform an exposure operation of a photographic frame, and a film wind-up unit including an electric motor to wind up a film by using said electric motor, when said successive photographing mode is selected by said photographing-mode selecting unit, the method comprising:
    starting a vibration correction operation by said vibration correcting unit before opening of said shutter for each frame;
    opening said shutter to begin an exposure operation of a frame;
    closing said shutter to complete an exposure operation of the frame;
    stopping the vibration correction operation by said vibration correcting unit;
    beginning a sampling operation to sample vibration signals to calculate a reference level to be used for a vibration correction operation during an exposure operation of a subsequent frame;
    beginning to wind the exposed frame of the film by said film wind-up unit to put the subsequent frame in a state ready for exposure; and
    stopping the sampling operation before start of the vibration correction operation for the exposure operation of a subsequent frame.

4. A method according to claim 3, wherein a period to sample vibration signals is constant in each sampling operation.

5. A camera having a vibration correcting function comprising:

a vibration detecting unit to detect vibration;

a vibration correcting unit to correct vibration in photographing based on a signal detected by said vibration detecting unit;

a photographing-mode selecting unit to select either a normal photographing mode or a successive photographing mode;

a shutter unit to open and close a shutter to perform an exposure operation of a photographic frame;

a film wind-up unit including an electric motor to wind up film by using said electric motor; and a control unit to start a vibration correction operation by said vibration correcting unit before opening of said shutter for each frame, and to stop a vibration correction operation by said vibration correcting unit immediately after closure of said shutter to complete an exposure operation of a frame, and then to start a sampling operation for sampling vibration signals to calculate a reference level to be used for a vibration correction operation during an exposure operation of a subsequent frame, before beginning to wind the exposed frame of the film by said film wind-up unit so that the subsequent frame is in a state capable of being exposed, and to stop the sampling operation after completion of winding the exposed frame of the film by said wind-up unit, when said successive photographing mode is selected by said photographing-mode selecting unit.

6. A camera according to claim 5, wherein a period for sampling vibration signals is constant in each sampling operation.

7. A method for controlling a camera having a vibration correcting function, the camera comprising a vibration detecting unit to detect vibration, a vibration correcting unit to correct vibration in photography, based on a signal detected by said vibration detecting unit, a photographing-mode selecting unit to select either a normal photographing mode or a successive photographing mode, a shutter unit to open and close a shutter so as to perform an exposure operation of a photographic frame, and a film wind-up unit including an electric motor, when said successive photographing mode is selected by said photographing-mode selecting unit, the method comprising:

starting a vibration correction operation by said vibration correcting unit before opening of said shutter for each frame;

opening said shutter to begin an exposure operation of a frame;

closing said shutter to complete the exposure operation of the frame;

stopping the vibration correction operation by said vibration correcting unit;

beginning a sampling operation to sample vibration signals to calculate a reference level to be used for a vibration correction operation during an exposure operation of a subsequent frame;

beginning to wind the exposed frame of the film by said film wind-up unit to put the subsequent frame in a state ready for exposure; and stopping the sampling operation after completion of winding the exposed frame of the film by said film wind-up unit.

8. A method according to claim 7, wherein a period to sample vibration signals is constant in each sampling operation.

* * * * *

UNITED STATES PATENT AND TRADEMARK OFFICE
CERTIFICATE OF CORRECTION

PATENT NO.:   5,978,599
DATED      :   November 2, 1999
INVENTOR(S):  Hiroshi Wakabayashi, et al.

It is certified that error appears in the above-identified patent and that said Letters Patent is hereby corrected as shown below:

Title Page,   [75]   Inventors:, DELETE "Yoshio Imura";

Column 14, line 20 (claim 14), change "compete" to --complete--.

Signed and Sealed this

Twelfth Day of September, 2000

Attest:

Q. TODD DICKINSON

*Attesting Officer*          *Director of Patents and Trademarks*